Aug. 15, 1944.   F. E. BARTELL   2,355,696
METHOD OF AND APPARATUS FOR PRODUCING LAMINATED GLASS
Filed Nov. 5, 1938
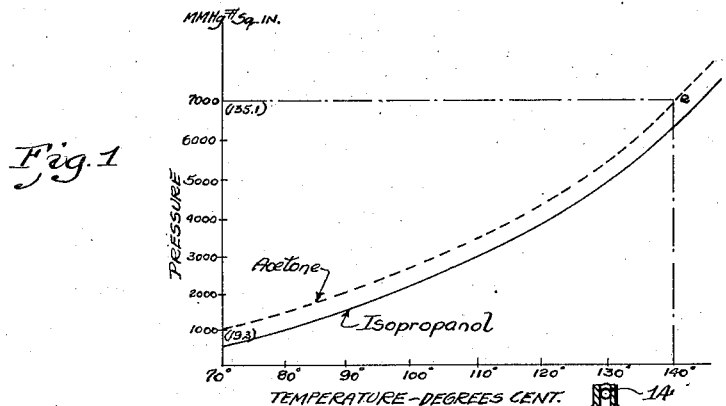
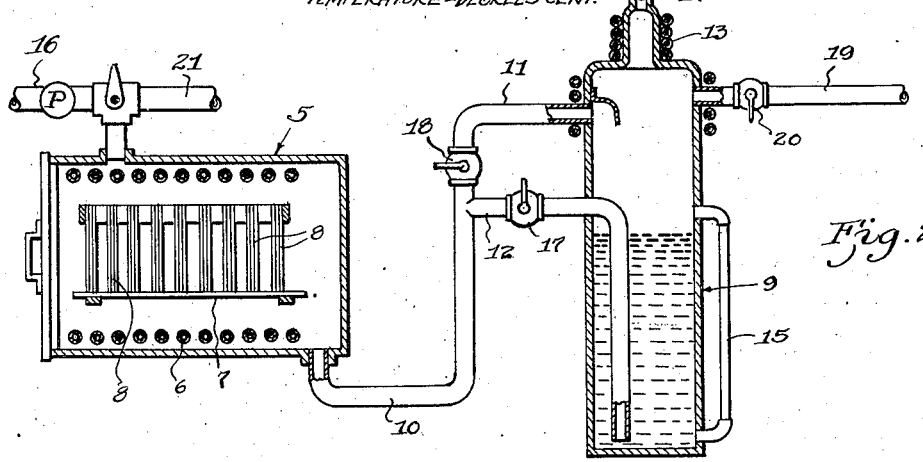
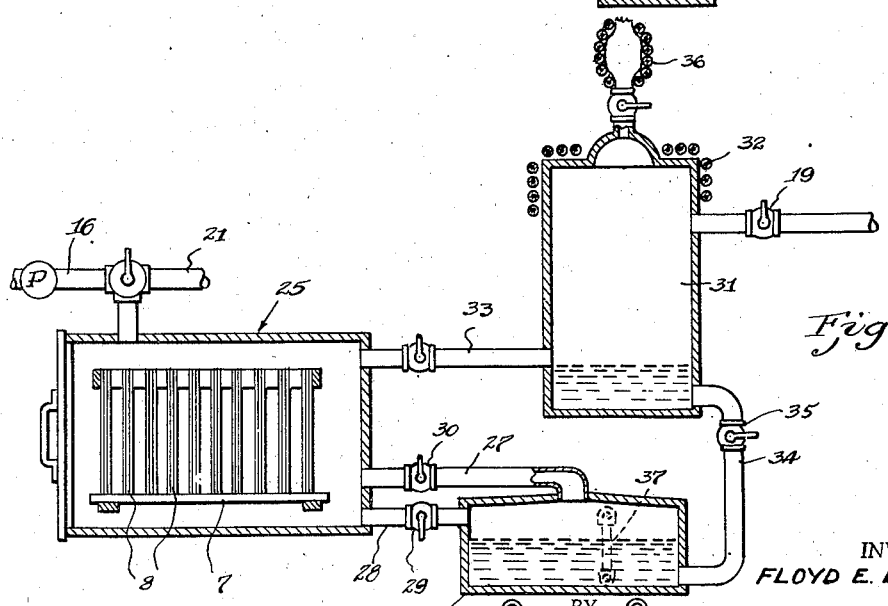
INVENTOR.
FLOYD E. BARTELL
BY
Barnes, Kisselle, Laughlin & Raisch
ATTORNEYS Patented Aug. 15, 1944

2,355,696

UNITED STATES PATENT OFFICE 2,355,696

METHOD OF AND APPARATUS FOR PRODUCING LAMINATED GLASS

Floyd E. Bartell, Ann Arbor, Mich.

Application November 5, 1938, Serial No. 238,939

9 Claims. (Cl. 154—2.80)

This invention relates to a method and apparatus for producing laminated glass.

Laminated or safety glass, as known today, comprises two or more sheets of glass and interposed layers of plastic or bonding material mounted thereto. There are numerous plastic layers and bonding layers that can be used in the production of safety glass and the present invention is, in no way, limited to any particular bonding or plastic material.

Ordinarily, in making safety glass, laminations are treated with the bonding material and then arranged in the proper superimposed relationship and subjected to the combined action of heat and pressure. The bonding materials are, in most cases, a plastic such as Celluloid or a polymerized product which is held between the two sheets of glass.

Specifically, the present invention relates to a method of bonding the plastic material to the glass through the use of a liquid which, upon being heated in a closed container, will, at a temperature suitable for lamination, make possible the necessary heat transfer and, at the same time, produce through its own vapor pressure, sufficient pressure to bring about the desired adhesion and give a laminated product which is free from air bubbles and other undesirable defects.

Heretofore, many different methods have been used to produce laminated glass. In practically all of these methods some means have been employed for producing a temperature suitable for slightly softening the plastic material and also some means, mechanical or otherwise, for producing pressure which will prove effective for lamination at the desired temperature.

It is an object of the present invention to make use of a liquid which by heating will form a vapor which can be used for producing the desired temperature to heat the glass and the bonding material and at the same time to give a vapor pressure which can be used as a source of pressure for laminations. It is a further object of the invention to provide a method for laminating glass in which air or other undesirable gases are expelled from between the laminations.

It is also an object of the invention to utilize a vapor as a heating agent and pressure agent in laminating processes, said vapor also to have characteristics which permit it to be retained between plastic materials without producing harmful effects.

An additional object of the invention has to do with the design of an apparatus wherein it is unnecessary that liquid be admitted to or contained in the pressure chamber utilized for the laminating process.

Other features and objects of the invention have to do with details of construction and operation of the apparatus and to the various steps of the process used to produce the laminated glass as will be brought out in the following description and claims.

In the drawing:

Fig. 1 is a chart illustrating the vapor-pressure temperature curve for specific substances which may be used in carrying out the process contemplated by the invention.

Fig. 2 is a sectional and partially diagrammatic illustration of an apparatus which may be used to carry out the process.

Fig. 3 is a sectional and partially diagrammatic illustration of a modified form of apparatus for carrying out the invention.

In the present invention, advantage is taken of the fact that as a liquid is heated, it tends to vaporize and if confined in a closed space, a vapor pressure is built up. The magnitude of this pressure is strictly dependent upon the temperature to which the liquid is heated. The higher the temperature, the greater will be the pressure, but for any given temperature of the liquid (i. e. pure liquid or one of given composition) which is in equilibrium with its vapor phase, there can exist but one constant and definite vapor pressure. Temperature vs. vapor pressure curves exist in the literature for all the more common liquids. In Fig. 1 is shown a temperature vs. vapor pressure curve for acetone (dotted lines). Temperatures in degrees centigrade are plotted on the horizontal axis and corresponding vapor pressures are plotted on the vertical (pressures are expressed both in terms of pounds per square inch and in millimeters of mercury). From the curve it is noted that when the temperature is 140° C. (point $e$ on the curve) the corresponding vapor pressure will be 6974 mm. Hg (International Critical Tables).

In the lamination of glass using cellulose acetate as plastic material, a temperature of 140° C. is a very favorable temperature, and a pressure of approximately 6000 to 7000 mm. Hg is likewise a very favorable pressure. Accordingly, by heating the liquid acetone in a previously evacuated container, a temperature and pressure which are entirely suitable for lamination are obtained simultaneously. Another suitable liquid in these respects is isopropanol, the temperature-pressure curve of which is shown in full line of Fig. 1.

In the method contemplated by the present invention a plastic material, such as cellulose acetate, which contains as a constituent, a plastic plasticizer such as dimethyl phthalate is placed between two sheets of glass. The steps of the method are briefly, as follows:

Sheets of glass are fastened together and placed in a pressure vessel. The vessel is then evacuated and after evacuation a volatile liquid is admitted to the vessel. The vessel is next heated to vaporize the liquid and the temperature is brought to that most suitable for lamination. At this temperature the vapor will come to thermal equilibrium with the liquid and will exert a pressure which is definite and constant for that temperature. This pressure will be such as is favorable for lamination. This pressure and temperature is maintained for a short period of from 3 to 5 minutes after which the liquid and the vapors are withdrawn from the vessel which is brought again to atmospheric pressure. The laminated glass may then be removed and the process repeated.

In Fig. 2, I have shown an apparatus which may be used to carry out the process above described. A pressure vessel or autoclave is shown at 5. Heating coils 6 are provided in the vessel. A shelf 7 is used to support the laminated glass 8. A storage tank 9 is connected to the pressure vessel by pipe 10 which is open to the storage tank through two branches 11 and 12. Cooling coils 13 are provided around the top of the storage tank 9 so that it may serve as a condenser. A gas outlet 14 is provided at the top of the tank and a sight glass for metering the liquid is shown at 15. To describe the process in detail, the sheets of glass with the plastic material between them are fastened together by means of spring clips and placed in the autoclave 5 shown at 8. The autoclave is then evacuated through pipe 16 thus removing gas or air from the autoclave as well as any gas or air which may be entrapped between the glass and the plastic material. After the evacuation, liquid acetone which is contained in the storage tank 9 is admitted to pipes 12 and 10 by a valve 17 from which it passes to the bottom of the autoclave. At this time a valve 18 in the branch 11 is closed. If necessary the liquid acetone may be forced from the tank 9 by air pressure passing through a pipe 19 and a valve 20. To insure that a given amount of liquid has been added, volume readings are made by the use of the sight glass 15. Valve 17 is then closed and the autoclave 5 heated by the use of coils 6 through which is passed superheated steam under pressure. The temperature in the autoclave may be raised in this manner to a suitable lamination temperature of, for example, 140° C. The temperature may vary, of course, from this value depending on the properties of the plastic material which is used in the lamination process. As soon as the contents of the autoclave have reached this temperature, the pressure, due to the vapor in the autoclave, will be suitable for lamination, in this case, approximately 6,000 mm. of Hg or more pressure. If some plastic is being used which would give more favorable adhesion with greater pressure, an inert gas such as nitrogen may be added to the autoclave. The autoclave is held at this temperature for a short period, usually from 3 to 10 minutes after which the acetone is returned through the connecting pipe 10 to the original container 9.

To force the acetone and vapor from the autoclave to the tank 9, it may be necessary to admit air pressure or an inert gas from the pipe 21 to the autoclave. After the liquid has all been removed, additional air is passed through the apparatus and practically all of the fumes of the acetone are carried out of the pipe 11 into the upper part of the container 9 where they are condensed by reason of the cooling coils 13. The acetone line 10 is now cut off at the valves 17 and 18 and the autoclave may then be opened and the laminated glass removed.

A modification of the apparatus shown in Fig. 2 is shown in Fig. 3. In this modification, the pressure vessel or autoclave is shown at 25. A boiler 26 for organic liquid is connected to the autoclave by pipes 27 and 28 which are controlled, respectively, by valves 29 and 30. A condenser 31, with suitable cooling coils 32, is connected to the top of the autoclave by a pipe 33 and is connected to the bottom of the boiler 26 by a pipe 34 in which is located a valve 35. A secondary condenser is shown at 36 above the primary condenser 31. A sight glass 37 is also provided on boiler 26. With the use of this apparatus an alternative method is accomplished. The heat is applied not directly to the autoclave, as in the previous modification, but to the boiler 26 where the organic liquid is vaporized and the vapors of the liquid are admitted to the autoclave through the pipe 27 and the valve 30. The same pressures and temperatures may be obtained in this way as in the previous method. When the laminating step is completed, liquid condensate in the autoclave is permitted to run back to the boiler through the pipe 28 and valve 29 and vapor is led through the pipe 33 to the condenser 31 where it is condensed and returned to the boiler through the valve 35 and pipe 34. In this manner, it will be seen that direct heat need not be applied to the autoclave and consequently it is easier for a workman to operate the same. In addition, no liquid need be furnished to the autoclave since the vapors pass direct from the boiler. With this apparatus it will be seen that the boiler may be kept under constant heat between the steps during which the autoclave must be opened to remove the laminated glass.

It should be pointed out that in the ordinary methods of lamination of glass either the temperature or the pressure or both may be varied somewhat from the most suitable values without preventing the production of a product of good quality.

In a similar manner, a mixture of two liquids can be used. When two liquids are present, each liquid will affect the vapor pressure of the other at a given temperature, but the total vapor pressure (gas pressure) set up will be the sum of the partial vapor pressures of each and thus temperatures and pressures suitable for lamination can be obtained with mixtures of liquids. As an example, ethyl formate and acetone have very nearly the same vapor pressures over a wide temperature range. Either one of these liquids may be used independently or both may be used together. By using a mixture of two liquids it becomes possible to alter the chemical or physical effects upon the plastic material and still obtain suitable temperature vs. pressure relationships.

One of the principal defects encountered in the lamination of glass has been caused by air which becomes entrapped between the glass and the plastic sheet. Such entrapped air is undesirable in that it remains in the laminated material resulting in air bubbles or producing irregular surfaces upon the plastic sheet held between the glass. In the present method, vapor of the liquid used to produce the heat and pressure for the lamination, may serve to fill any existing spaces previously occupied by air or other undesirable gases. These vapors act to a limited extent, as a softening or plasticising agent on the plastic bonding material and may be retained between the plastic materials without producing the harmful effects caused by air or other gases. During the process the pressure vapors also prevent the rapid escape of the softening or plasticising agent from the plastic sheet, as the temperature is raised in the process of lamination. In addition, the vapors of the liquids serve as an excellent medium of heat transfer from the source of the heat to the glass which is to be laminated.

While the above example indicates how glass can be laminated when cellulose acetate is used as plastic material, it does not follow that the plastic material must be cellulose acetate. It may be any one of a number of materials which will give suitable bonding and adhesion to glass and at the same time possess in itself, flexibility and strength, such, for example, as cellulose nitrate, ethyl cellulose, or a polymerized plastic such as poly-vinyl acetate or methyl methacrylate. Neither is it necessary that the liquid be acetone, as any liquid may be used which has some affinity for and is compatible with the plastic material and at the same time possesses such vapor pressure characteristics that at ordinary temperatures, the vapor pressure is relatively low, while at the temperatures suitable for lamination of the glass, the vapor pressures are preferably sufficiently high to furnish the pressure essential for lamination; although in some instances additional pressure for lamination might be obtained from added gases. Ethyl formate and liquids with somewhat similar properties and with similar vapor pressures at given temperatures might be used.

However, it so happens that acetone, ethyl formate, and other organic liquids having somewhat similar properties are inflammable and must be handled with great care. Certain alcohols such as isopropyl alcohol have especially favorable vapor pressure characteristics and give an excellent lamination but these are also inflammable. On the other hand, a chlorinated organic compound such as trichlormethane is non-inflammable and also suitable as far as vapor pressure is concerned, but such compounds tend to be unstable when heated under pressure and tend to decompose if used repeatedly in contact with air or water.

I have found, however, that the presence of alcohol tends to stabilize such halogenated compounds and also that the presence of a sufficient amount of one of these halogenated compounds renders an alcohol, such as isopropyl alcohol, non-inflammable; thus a combination of these two types of liquids gives a relatively stable non-inflammable liquid which is suitable for lamination purposes.

Example of a suitable liquid mixture is:

| | Parts |
|---|---|
| Trichlormethane | 1 |
| Isopropyl alcohol | 2 |

The above liquids are completely miscible in these proportions and at temperatures suitable for lamination, 140° to 150° C., produce pressures favorable for that purpose. In Fig. 1, the solid line curve illustrates the pressure-temperature characteristics of the above mixture.

I have found also that by adding an inert gas, such as nitrogen, to the autoclave during the cooling process, a non-explosive mixture is obtained with, for example, isopropanol, and the condensation of the isopropanol may be accomplished without loss of pressure.

What I claim is:

1. A method of laminating sheets of glass and reinforcing material which comprises placing the sheets in a closed compartment, evacuating air from said compartment, introducing liquid into said compartment, and subjecting said sheets simultaneously to heat and pressure by heating said liquid to form a heated vapor at a predetermined pressure.

2. In the process of producing laminated glass, the steps which comprise arranging in a closed compartment, suitably treated sheets in superimposed relationship to produce a sandwich of glass and a reinforcing material which is soluble in acetone, evacuating said compartment and applying to said sandwich a laminating pressure by introducing liquid acetone into said compartment and heating the same to produce a vapor at the proper temperature and pressure for lamination.

3. In the process of producing laminated glass, the steps which comprise arranging, in a closed compartment, suitably treated laminations in superimposed relationship to produce a sandwich of glass and reinforcing material, evacuating said container, introducing into said compartment a liquid, the vapor of which will exert a proper vapor pressure for lamination at a temperature suitable for lamination, and heating said liquid to the desired temperature.

4. In the method of making laminated glass in which is used an interlayer of cellulose acetate or the like placed between two sheets of glass, a step of applying heat and pressure to laminate said glass and plastic which comprises bringing into direct contact with said glass and plastic, a heated vapor formed from liquid acetone having vapor pressure characteristics such that at a temperature which will produce a slight softening of the plastic material, the vapor pressure of the liquid will be sufficiently high to produce a high degree of adhesion between the glass and plastic material.

5. A method of laminating sheets of glass and reinforcing material which comprises placing the sheets in a closed compartment, evacuating air from said compartment, and subjecting said sheets simultaneously to heat and pressure exerted by a heated vapor which is soluble in said reinforcing material.

6. A method of laminating sheets of glass and a reinforcing material of cellulose acetate which comprises placing the sheets in a closed compartment, evacuating the air from said compartment, and subjecting said sheets simultaneously to heat and pressure exerted by a heated vapor of isopropyl alcohol.

7. In the process of making laminated glass, the steps of arranging glass sheets on each side of a plastic interlayer, and uniting the resulting assembly to form a lamination by subjecting the assembly to heat and pressure of a vapor which is soluble in the interlayer whereby any vapor entrapped in the lamination will dissolve in the interlayer and eliminate defects.

8. The method of laminating sheets of glass and a reinforcing interlayer material which comprises placing the sheets in a closed compartment, evacuating air from said compartment and from between said sheets and subjecting said sheets simultaneously to the heat and pressure of a vapor soluble in said interlayer whereby any vapors entrapped in the laminations will dissolve in the interlayer and eliminate defects.

9. A method of making a laminated glass which comprises arranging within a container, sheets of glass and an interlayer of plastic material, removing air from said container and from between said sheets, introducing into said container a vapor at a predetermined pressure and temperature and of such physical characteristics as to be soluble in and to soften the plastic, and subjecting said sheet assembly simultaneously to the heat and pressure of said vapor to unite the same to form a lamination.

FLOYD E. BARTELL.